May 1, 1934.   A. SHOFFMAN   1,956,932
STEERING GEAR OF MOTOR VEHICLES
Filed Jan. 21, 1932   2 Sheets-Sheet 1
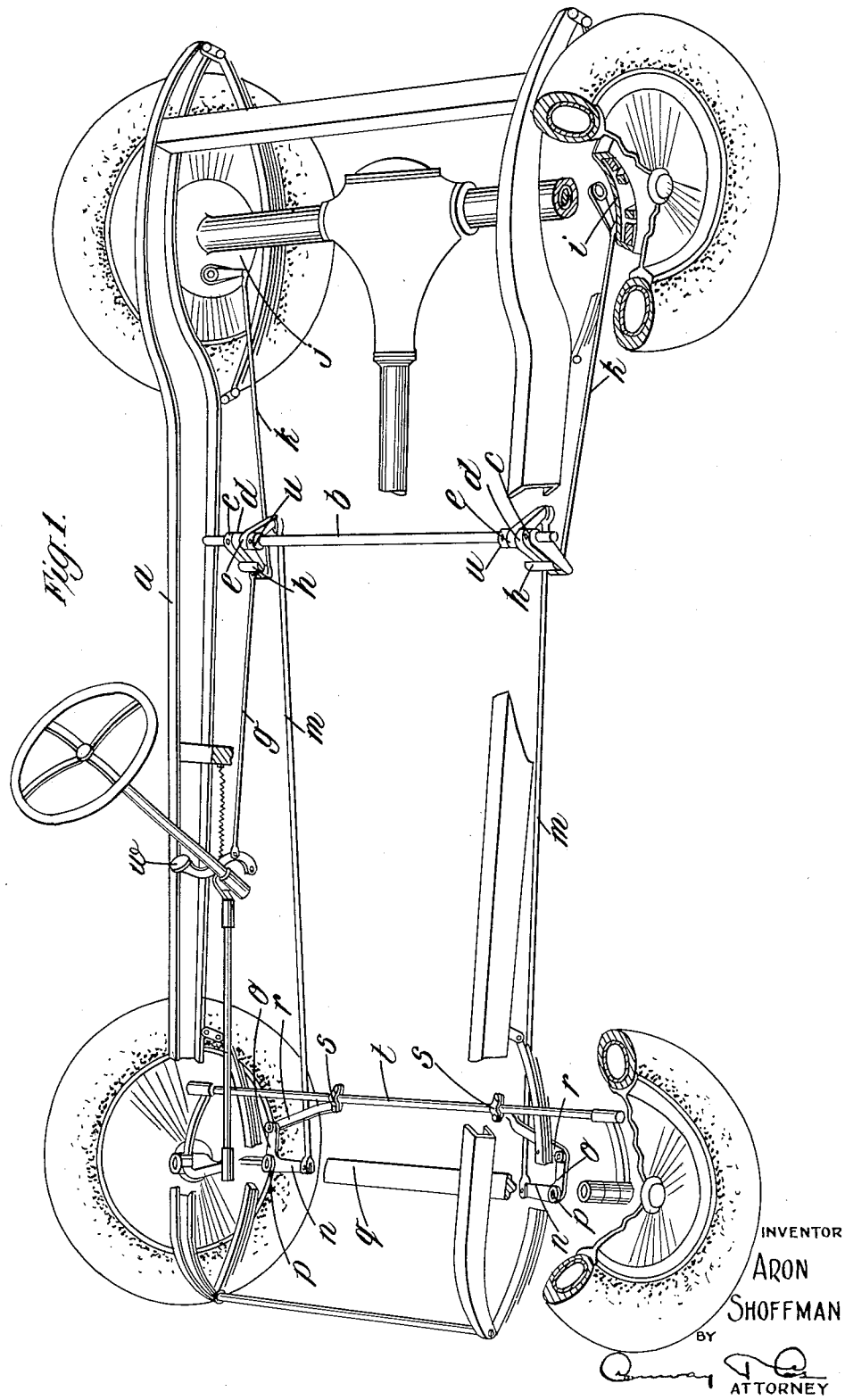
INVENTOR
ARON SHOFFMAN
BY
ATTORNEY May 1, 1934.                    A. SHOFFMAN                    1,956,932
                       STEERING GEAR OF MOTOR VEHICLES
                       Filed Jan. 21, 1932        2 Sheets-Sheet 2
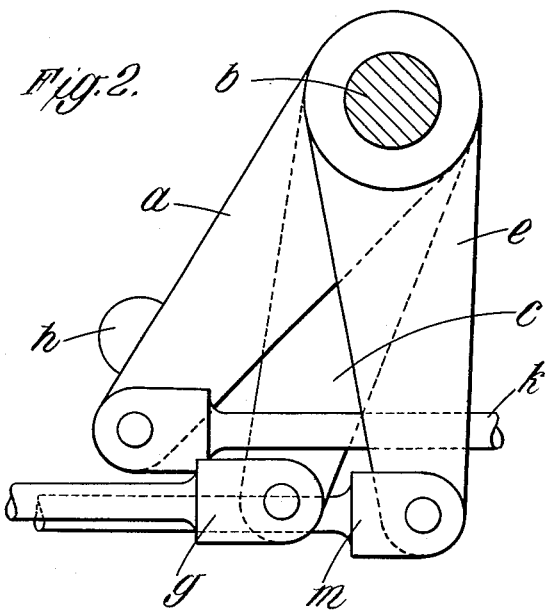
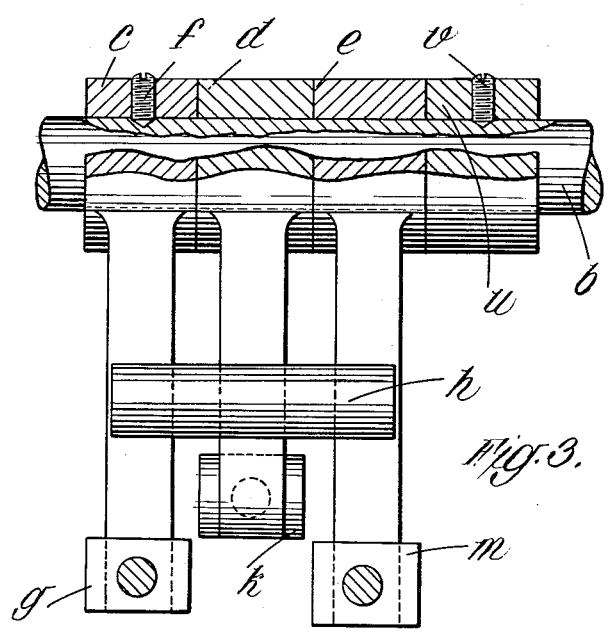
INVENTOR
ARON SHOFFMAN
BY
ATTORNEY Patented May 1, 1934

1,956,932

UNITED STATES PATENT OFFICE 1,956,932

STEERING GEAR OF MOTOR VEHICLES

Aron Shoffman, West Kensington, London, England

Application January 21, 1932, Serial No. 587,997
In Great Britain January 21, 1931

1 Claim. (Cl. 180—18)

The object of the present invention is to enable a motor vehicle to be turned on a small radius with greater ease than is possible with vehicles as hitherto constructed and to minimize the risk of skidding whilst so turning, and at the same time to relieve the front wheels and axle of the lateral strain to which they have been submitted.

It has been proposed in connection, particularly, with tractors for land cultivation to provide mechanism of a nature that, to effect quick turning, the steering mechanism, on actuation, simultaneously applies a brake to that driving wheel on the side towards which the tractor is being turned, the arrangement being such that limited movements of the steering wheels can be effected without actuation of the brakes, but, when a short quick turn is to be made, extreme movement of the steering wheels will serve to apply the brake to the inner traction wheel thereby accelerating greatly the turn and shortening its radius. Furthermore, it is known in connection with motor vehicles, to provide mechanism integral with the vehicle, which is effective to apply a brake to the inner rear wheel immediately on actuation of the steering mechanism.

In accordance with the present invention, which embodies the principle set out above, means are provided, independently of a motor vehicle and capable of being attached very readily to any type of vehicle, said means being adapted to be actuated by the steering mechanism, and to be combined with the normal braking mechanism fitted on a vehicle for the purpose of retarding the movement of the rear or driving wheel at that side towards which the vehicle is being steered. Preferably such means comprise link and lever mechanism adapted to be controlled from the steering track or transfer rod and incorporating lost motion mechanism to enable the vehicle to be turned to a predetermined extent before an application of the brake, so that there is no interference with normal steering of said vehicles.

When the steering movement exceeds said predetermined extent, the rear or driving wheel on that side towards which the car is steered, is retarded, thus causing the car to pivot about a vertical axis passing through the centre of said wheel or about a vertical axis to one side of said wheel at a distance varying with the extent of retardation.

The invention may be carried out by connecting some part of the steering mechanism with the individual brakes of the rear or driving wheels through mechanism permitting lost motion, not only between the steering mechanism and said brakes, but also between said brakes and the means by which, normally, they are applied, so that the application of the brakes by normal means will not interfere with the means by which a brake is applied from the steering mechanism, and vice versa.

For example, link and lever mechanism connected with the individual brakes may be arranged to co-act, after a lost movement, with a projection from the usual track rod of the front or steering wheels, or the link and lever mechanism may be connected directly with said track rod and lost motion mechanism may be introduced between said link and lever mechanism and the means by which the brakes are applied normally.

One form of the invention will now be described with reference to the accompanying drawings, of which Figure 1 is a perspective view of a motor-car chassis (with parts broken away or omitted for the sake of clearness) showing the invention applied thereto, Figure 2 is a fragmentary side elevation, to an enlarged scale, of link and lever mechanism providing the "lost-motion" between the movement of the road steering wheels and the actual application of the right or left-hand brake, and Figure 3 is a fragmentary front elevation, also to an enlarged scale, of the said link and lever mechanism.

Mounted on the chassis $a$, substantially midway of the length thereof, is a transverse brake shaft $b$ at each side of which are mounted three downwardly depending levers $c$, $d$ and $e$, the levers on the right-hand side of the chassis being complementary to those on the left-hand side, hence a description of the operation of those on the one side, say the right-hand side will explain the action of those on the other side. The outer lever $c$ is secured to the shaft $b$ by means of a set screw $f$ and is connected at its lower end by means of a rod $g$ with the brake pedal $w$ (or hand-lever, not shown,) in the usual manner, the left-hand side outer lever being free at its lower end and motion being transmitted thereto by the turning of the shaft $b$. The centre lever $d$ is sleeved on the shaft $b$, is provided, at that side thereof facing the front of the chassis $a$, with a bridge piece $h$ extending on either side of said lever $d$ by an amount approximating the transverse thickness of the levers $c$ and $e$ i. e. the length of the bridge piece $h$ is substantially three times the thickness of each of the levers c d and e, and is connected in the usual manner with the brake drum i on the rear wheel hub j by means of the rod k.

The third, or inner lever e is sleeved upon the shaft b and, normally, is displaced angularly from the levers c and d, projecting towards the rear of the chassis, the lower end of said lever e being connected by means of a rod m with the one arm n of a bell-crank lever n o pivotally secured on a bracket p on the front axle q of the chassis a, the other arm o of said bell-crank lever n o being connected by the link r with a collar s secured to the steering track rod t.

The levers d and e are retained in their positions on the shaft b by means of a collar u secured to said shaft by the set screw v.

The manner of operation is as follows:—For an ordinary application of the brakes, the brake pedal w (or the hand lever) is actuated, and the lever c is pulled forwardly through the rod g to act at once on the one side of the bridge piece h thereby causing the lever d to follow its motion and to apply the brakes through the rod k (the application of the left-hand side brake being effected by the similar movement of the levers c and d on the left hand side, such movement being transmitted thereto through the shaft b. It will be observed that during this operation the lever e is not moved and does not interfere in any way with a normal application of the brakes.

When, now, the car is steered towards the one side or the other, say for example, when a right-hand turn is made, the steering track rod t is moved to the left, thereby acting on the lever e through the link r, bell-crank lever n o, and rod m, to pull said lever e forwardly. As the lever e is displaced angularly towards the rear, it will move a predetermined distance before engaging the bridge piece h i. e. there will be a "lost motion" interval between the commencement of the turning of the road steering wheels, and the engagement of the lever e with the bridge piece h to apply the brake in the same manner as described in connection with a normal brake application. As the lever e is sleeved upon the shaft b no motion will be imparted to the bridge-piece on the left-hand side of the chassis particularly as the lever e on that side is forced further to the rear by the movement of the track rod t to the left.

It will be clear that by turning the road steering wheels, say, to the right, the brake on the right-hand rear wheel will be applied only after the wheels have been turned through a predetermined angle, say 45°, so that for ordinary steering; without any small radius turn, the device of this invention will be inoperative, but in the event of the wheels being turned beyond this predetermined extent, i. e. to take, a very sharp corner or to swerve to avoid an object suddenly appearing in the roadway ahead, the brake on that side towards which the car is being steered will be applied and the car will pivot about a point passing through the axis of the rear wheel on that side (or about an axis parallel to said first mentioned axis) thereby enabling the car to turn more quickly with a minimum risk of skidding and, in addition, relieving the front axle of the strain to which it is subjected under present conditions.

It is to be observed that in the case of hydraulic brakes, a modification of the control levers would be necessary, for instance, the lever e may be arranged to control an auxiliary cock in the individual pipe to the rear brake cylinder after the road wheels have turned to the predetermined extent, whilst in the case of four-wheel brakes, it will be clear that the front wheel brakes must not be applied by turning of the road wheels.

By means of this invention, a motor vehicle may be turned easily in a very small space without affecting the general design of the car or its normal running.

I claim:

In a motor vehicle comprising a steering mechanism, including a transverse track rod, a pair of rear driving wheels, and a conventional braking mechanism having brake actuating means and a brake rod, dirigible braking means operable independently of the brake actuating means of said conventional braking mechanism, said brake rod being common to said conventional braking mechanism and said dirigible braking means, said dirigible means being actuated by movement imparted to said steering mechanism when the vehicle is turned to one side for retarding the movement of that driving wheel on the side to which said vehicle is being turned, the other rear driving wheel being free to function without retardation or acceleration, said dirigible means including bell crank levers pivoted on said vehicle and connected by links with said transverse track rod, a lost motion mechanism connected by links to said bell crank levers for delaying the retardation of the rear driving wheel which is braked until the steering mechanism has turned through a predetermined distance, said lost motion mechanism comprising a lever, a second lever, a cross member carried on said second lever and adapted to be actuated by motion of said first lever after said first lever has moved a predetermined distance, said second lever being attached to said brake rod, whereby said levers and brake rod actuate the brake upon movement of the first named lever caused by turning of the vehicle.

ARON SHOFFMAN.